US000001486H

United States Statutory Invention Registration [19]

[11] Reg. Number: H1486

Rhein et al.

[43] Published: Sep. 5, 1995

[54] OXODIMETHYLDISILACYCLOHEXADIENEHOMOPOLYMER

[75] Inventors: Robert Rhein; James C. Baldwin, both of Ridgecrest, Calif.

[73] Assignee: The United States of America as represented by the Secretary of the Navy, Washington, D.C.

[21] Appl. No.: 70,031

[22] Filed: May 28, 1993

[51] Int. Cl.[6] ..... C08G 77/20
[52] U.S. Cl. ..... 528/32; 528/37
[58] Field of Search ..... 528/32, 37

[56] References Cited

U.S. PATENT DOCUMENTS 3,465,018 9/1969 Atwell ..... 528/37

OTHER PUBLICATIONS

Watanabe et al, The Journal of Organometallic Chemistry 128(1977) 173–175.

*Primary Examiner*—Donald P. Walsh
*Assistant Examiner*—Chrisman D. Carrol
*Attorney, Agent, or Firm*—Melvin J. Sliwka

[57] ABSTRACT

A new siloxane polymer containing disilacyclohexadiene rings in the polymer backbone and a commercially viable method of making it are disclosed. The new polymer is an elastomer, and it has unsurpassed thermal stability. Some of the thermal, mechanical, and chemical properties of the new polymer are described.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OXODIMETHYLDISILACYCLOHEXADIENEHOMOPOLYMER

BACKGROUND OF THE INVENTION

1. Field of Invention

This invention pertains to a composition of matter and a method of preparing it. More precisely, this invention involves the chemistry of organo-silicon compounds and a new compound of this class. Specifically, this invention reveals the compound poly-1,4-oxo-1,4-dimethyl-1,4-disilacyclohexadiene and a method of preparing it. This compound is useful as an adhesive, insulator, potting agent, and composite material constituent in any application requiring an elastomer for high temperature environments. Polymers of disilacyclohexadienes possess greater thermal stability than any other known family of polymers.

2. Description of the Related Art

The silicone rubber industry is based on a chemical process called the direct process, wherein methyl chloride is reacted with elemental silicon to produce mixed methylchlorosilanes. The monosilicon methylchlorosilanes are then used to produce conventional silicone rubbers. The direct process produces a byproduct known as direct process residue which consists of methylchlorosilanes having multiple silicon atoms. These higher methylchlorosilanes can be processed chemically to monosilanes to increase the yield of the direct process, or they can be used as the starting material to make other organosilicon compounds.

The fraction of direct process residue that boils in the range 150°–160° C. is a source of methylchlorodisilanes. A method for isolating 1,2-dimethyltetrachlorodisilane from this fraction and then converting it to 1,2-dimethyltetramethoxydisilane has been reported by Watanabe et al in the Journal of Organometallic Chemistry, 128 (1977) 173–175. Watanabe's technique involves two steps. The disilane fraction is first chlorinated with dry hydrogen chloride in the presence of aluminum chloride to convert the unwanted trimethyltrichlorodisilane into sym-dimethyltetrachlorodisilane. The sym-dimethyltetrachlorodisilane is next purified by distillation and then treated with methylorthoformate to replace the chlorine atoms with methoxy groups. The result is 1,2-dimethyltetramethoxydisilane. The 1,2-dimethyltetramethoxydisilane resulting from Watanabe's technique can be converted into sym-1,4-dimethyl-1,4-dimethoxy-1,4- disilacyclohexadiene by the method disclosed in Atwell's U.S. Pat. No. 3,465,018. Atwell's method consists in part of reacting a substituted tetramethoxydisilane precursor with an acetylene at elevated temperature to produce a compound with the disilacyclohexadiene ring structure.

Example 7 in Atwell's patent shows a polymer made by exposing a dihydroxy substituted disilacyclohexadiene ring compound to acid catalyzed condensation polymerization. This is a standard polymerization technique wherein water is eliminated from two hydroxyl groups, allowing an oxygen atom to bridge together two monomer molecules. The process continues until many monomers are connected. The resulting polymer, 1,4-dimethyl-2,3,5,6-tetraphenyl- 1,4-polydisilacyclohexadienol, is the only known disilacyclohexadiene ring polymer in the prior art. This polymer is reported to have a melting point ranging from 10° C. to 320 ° C. Such a range of melting points indicates that the polymer is not an elastomer and that it has a very broad molecular weight distribution. Moreover, complete melting at 320° C. indicates that the thermal properties are substantially inferior to other well known polymers, including many commercial polysilanes and polysiloxanes.

Disilacyclohexadiene ring polymers must be commercially viable to be truly useful. The diphenylacetylene used in the synthesis of Atwell's ring polymer is expensive and relatively rare. The present invention uses ordinary, inexpensive acetylene gas to synthesize the disilacyclohexadiene ring structure. The result is a ring without substituent groups at the 2,3,5,6 positions. The chemistry of this "naked ring" is different than that of a ring with bulky phenyl groups attached to it. For this reason the diol of the unsubstituted ring could not be isolated. Attempts to do so led to uncontrolled polymerization and useless gooey masses. A new approach to condensation polymerization would be needed to allow unsubstituted disilacyclohexadiene to polymerize in a controlled way.

While the diol of unsubstituted disilacyclohexadiene ring proved to be very difficult to isolate, isolating the dipotassium salt of the diol proved to be straightforward. Moreover, the dipotassium salt can be made without first making the diol. The dipotassium salt was found to behave like a base in the presence of acids, forming the potassium-acid salt and ring diol. The ring diol thus formed immediately polymerized in a controlled manner. The use of a potassium salt as a polymer precursor is an unconventional technique that in this case solved an otherwise intractable problem. The process can be understood as acid-base condensation polymerization, and the dipotassium salt of the diol of disilacyclohexadiene makes it possible.

This invention provides a new disilacyclohexadiene polymer and a method of preparing it. The new polymer, poly-1,4-oxo-1,4-dimethyl- 1,4-disilacyclohexadiene, is an elastomer that exhibits thermal stability superior to any previously known polymer. This new polymer is prepared from inexpensive, widely available materials, providing the potential for commercial manufacture.

SUMMARY OF THE INVENTION

This invention provides a new polymer with outstanding thermal stability and an economical method of preparing it. Starting with a byproduct of the silicone rubber industry called direct process residue, sym-dimethyltetrachlorodisilane is isolated by chlorination with HCl and $AlCl_3$ followed by distillation. This compound is then converted to 1,2-dimethyltetramethoxydisilane by reaction with methylorthoformate. 1,2-dimethyltetramethoxydisilane is then reacted With acetylene gas at elevated temperature to produce sym-1,4- dimethyl-1,4-dimethoxy-1,4-disilacyclohexadiene. This compound is then reacted with potassium hydroxide to create 1,4-dimethyl-1,4-disilacyclohexadiene-1,4-di(potassium silanoate). The dipotassium disilanol salt is dissolved in ethanol and then reacted with HCl. Extraction with water and organic solvent followed by evaporation of the organic phase gives the elastomer poly-1,4- oxo-1,4-dimethyl-1,4-disilacyclohexadiene, characterized by the structure:

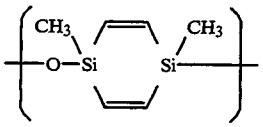

This homopolymer showed only a 5% weight loss by thermogravimetric analysis to 1000° C.

DETAILED DESCRIPTION AND EMBODIMENTS

The preparation of poly-1,4-oxo-1,4-dimethyl-1,4-disilacyclohexadiene begins with the fraction of direct process residue that boils between 150° and 152° C. This fraction is refluxed in the presence of aluminum chloride while dry hydrogen chloride is bubbled into the mixture. After the reaction is complete, the liquid is decanted and distilled with acetone. The fraction boiling between 150° and 152° C. is collected for the next step. This fraction consists of almost pure sym-dimethyltetrachlorodisilane. Methylorthoformate is next added to the dimethyltetrachlorodisilane and allowed to react for several hours in a stirred vessel at about 70° C. Vacuum distillation of the resulting mixture gives symdimethyltetramethoxydisilane in the fraction boiling at 82° C. The chemistry explained in this and the preceding paragraph was first disclosed by Watanabe et al in the Journal of Organometallic Chemistry, 128(1977) 173–175.

The sym-dimethyltetramethoxydisilane is next reacted with acetylene in the method disclosed by Atwell in U.S. Pat. No. 3,465,018. Nitrogen gas carries acetylene gas into a glass tube heated to 400° C. Into this gas stream, sym-dimethyltetramethoxydisilane is added dropwise. The liquid reaction product is collected in a condenser equipped flask at the discharge end of the glass tube. The liquid product is then purified by vacuum distillation at less than 1 torr absolute pressure and 50° C. The resulting product is sym-1,4-dimethyl-1,4-dimethoxy1,4-disilacyclohexadiene with some impurities.

The impure sym-1,4-dimethyl-1,4-dimethoxy-1,4-disilacyclohexadiene is next reacted with potassium hydroxide dissolved in a methanol/water solution by slowly adding the silane to the KOH solution. The solution is then filtered and vacuum dried to remove most of the solvent. Tetrahydrofuran is then added, causing a precipitate to form. The precipitate is next filtered and washed with tetrahydrofuran and ether, and then recrystallized from isopropanol. A final wash of the solids with isopropanol and pentane gives pure 1,4-dimethyl- 1,4-disilacyclohexadiene- 1,4-di (potassium silanoate ). The 1,4-dimethyl-1,4-disilacyclohexadiene-,4-di(potassium silanoate) is next dissolved in ethanol. Concentrated hydrochloric acid is added to the solution, causing potassium chloride to precipitate out. Water and methylene chloride are then added to the solution, dissolving the potassium chloride and forming a two phase mixture. The organic phase is then decanted from the mixture. Upon evaporation of the methylene chloride at ambient temperature, an elastomer results. This elastomer is the new compound poly-1,4-oxo1,4-dimethyl- 1,4-disilacyclohexadiene.

The preferred embodiment of this invention may be further understood by referring to the following examples. These examples are given to illustrate but not limit this invention.

EXAMPLE

Step 1. Preparation of dimethyltetrachlorodisilane from direct process residue Direct process residue was distilled to obtain the fraction that boils between 150° and 152° C. 754.0 grams of this fraction were refluxed in the presence of 54.9 grams of aluminum chloride, while dry HCl gas was bubbled into the mixture. After refluxing for 34 hours and 12 minutes, the mixture was cooled and the liquid decanted into another vessel where 50 ml of reagent grade acetone were added. This mixture was distilled, and 652.5 grams of the fraction boiling in the range of 150° to 152° C were collected. Gas chromatography showed the fraction to be 97% pure. Boiling point, infrared spectroscopy, and proton NMR were used to positively identify this fraction as sym- 1,2-dimethyl-1,1,2,2- tetrachlorodisilane.

Step 2. Preparation of dimethyltetramethoxydisilane from 1,2-dimethyl1,1,2,2-tetrachlorodisilane In a stirred vessel at 68° C., 572.8 grams of methylorthoformate were added slowly to 466.0 grams of 1,2-dimethyl- 1,1,2,2-tetrachlorodisilane. The mixture remained at 68° C. for 14 hours and 21 minutes. The mixture was then vacuum distilled at 28 torr, and 246.0 grams of the fraction boiling at 84° C were collected. Gas chromatography showed the fraction to be 97% pure. Boiling point, infrared spectroscopy and proton NMR were used to positively identify this fraction as 1,2-dimethyl-1,1,2,2- tetramethoxydisilane.

Step 3. Preparation of 1,4-dimethyl-1,4-dimethoxy-1,4-disilacyclohexadiene from 1,2-dimethyl-1,1,2,2-tetramethoxydisilane and acetylene:

A pyrex tube 22 mm in diameter and 19 inches in length was heated to between 400 and 425° C. Nitrogen gas flowing at less than 10 ml/min was mixed with 43 ml/min of acetylene gas and admitted into one end of the tube. 1,2-dimethyl-1,1,2,2-tetramethoxydisilane was added dropwise at a rate of 0.142 ml/min to the inlet gas stream. Liquid reaction product was collected at the tube discharge in a condenser equipped receiving flask. Gas chromatography indicated that the liquid product had two main constituents. One was identified by boiling point and peak retention time as methyltrimethoxysilane. Boiling point, infrared spectroscopy and proton NMR were used to positively identify the other constituent as 1,4-dimethyl- 1,4- dimethoxy- 1,4-disilacyclohexadiene.

Excess heat during the distillation of the product caused polymerization in the still. Partial purification was achieved by vacuum distillation at less than one torr absolute pressure and at temperatures below 50° C. This procedure provided 1,4-dimethyl-1,4-dimethoxy-1,4-disilacyclohexadiene of 67% purity as shown by gas chromatography.

Step 4. Preparation of 1,4-dimethyl-1,4-disilacyclohexadiene-1,4-di(potassium silanoate ) from 1,4-dimethyl- 1,4-dimethoxy-1,4-disilacyclohexadiene 16 ml of crude 1,4-dimethyl-1,4-dimethoxy-1,4-disilacyclohexadiene from step 3 were added slowly to 83.2 ml of 3.835 M KOH in 90% methanol and 10% water. The resulting mixture was filtered and the filtrate was vacuum evaporated at 60° C. to remove most of the solvent. 150 ml of tetrahydrofuran were then added, resulting in a precipitate and a two phase mixture. The precipitate was removed by filtration and washed with a small amount of tetrahydrofuran and ether. The precipitate was next dissolved in 100 ml of boiling isopropanol. Upon cooling, a crystalline mass separated from solution. The crystals were filtered and washed with 60 ml of isopropanol and 50 ml of pentane, followed by vacuum evaporation to remove residual solvent. 5.76 grams of crystals resulted. Proton NMR, infrared spectroscopy, and wet chemical techniques were used to identify the crystals as being pure 1,4-dimethyl-1,4-disilacyclohexadiene-1,4di(potassium silanoate). Infrared absorption bands were found at: 2890/cm (w), 810/cm (sb) for Si—$CH_3$ and 1340/cm (ms), 930/cm (sb), speculated to be the silane ring band. The proton NMR was run in deuterium oxide and perdeuteroacetone, showing peaks at 0.0 ppm for Si—$CH_3$ and 6.95 ppm for —CH=. The crystals were white, opaque, and very fine, and were found to be soluble in water, methanol, and ethanol.

Step 5. Preparation of the homopolymer poly-1,4-oxo-1,4-dimethyl-1,4disilacyclohexadiene from 1,4-dimethyl- 1,4-disilacyclohexadiene- 1,4- di (potassium silanoate)

3.89 grams of 1,4-dimethyl- 1,4-disilacyclohexadiene-1,4-di(potassium silanoate) from step 4 were dissolved in 10 ml of water in a stirred beaker at ambient temperature and pressure. This solution was then titrated to the phenolphthalein end point with glacial acetic acid, resulting in a precipitate of potassium acetate. The solution was next extracted with ether, forming two phases. The organic phase was decanted and the ether was removed by vacuum evaporation. 1.59 grams of a tan, viscous polymer resulted. The polymer was poly-1,4-oxo1,4-dimethyl-1,4-disilacyclohexadiene. Spectral properties were found to be: Infrared absorption bands at 2933/cm (mw), 1255/cm(m), 822/cm (m), Si—$CH_3$; 1035/cm (s), Si—O—Si; and 1340/cm (m), associated with the ring. The proton NMR showed a singlet at 6.86 ppm for -CH- and a very close doublet at 0.18 and 0.20 ppm for Si—$CH_3$.

EXAMPLE 2

Step 1. Preparation of 1,4-dimethyl-1,4-disilacyclohexadiene-1,4-di(potassium silanoate)

The procedures of steps 1 through 4 of Example 1 were repeated to provide starting material for this example. While the methods and reaction conditions were identical to those in example 1, the amounts of materials used were increased proportionally to give a larger amount of dipotassium salt to work with.

Step 2. Preparation of the homopolymer poly-1,4-oxo-1,4-dimethyl-1,4disilacyclohexadiene from 1,4-dimethyl-1,4-disilacyclohexadiene-1,4- di(potassium silanoate)

32.2 grams of 1,4-dimethyl-1,4-disilacyclohexadiene-1,4-di(potassium silanoate) were dissolved in 300 ml of ethanol in a stirred beaker at ambient temperature and pressure, Concentrated hydrochloric acid was then added dropwise to the solution until reaching the phenolphthalein end point after 20.85 ml of acid were consumed. A precipitate of potassium chloride resulted. 150 ml of methylene chloride and 220 ml of water were next added to the solution, dissolving the potassium chloride and giving a two phase mixture. The organic phase was then decanted and poured into teflon coated aluminum foil dishes. Upon evaporation of the solvent at ambient temperature and pressure, an elastomer remained. This elastomer was poly-1,4-oxo-1,4-dimethyl-1,4-disilacyclohexadiene. The elastomer lost only 5% of its weight in thermogravimetric analysis to 1000° C. Some mechanical properties of the elastomer at ambient temperature were found to be: Stress at breaking, 19.7 psi; Strain at breaking, 26.2%; Work to break, 2.42 in-Lb/$in^3$.

Obviously numerous modifications and variations of the present invention are possible in light of the above teachings. It is therefore to be understood that within the scope of the appended claims the invention may be practiced otherwise than as specifically described herein.

What is claimed is:

1. The elastomer compound poly-1, 4-oxo-1, 4-dimethyl-1, 4-disilacylcohexadiene having infrared absorption bands at 2933/cm(mw), 1255/cm(m), 822/cm(m), Si—$CH_3$, and 1035/cm(s), Si—O—Si, and 1340/cm(m), associated with the ring, and by proton NMR showing a singlet at 6.86 ppm for —CH—and a very close doublet at 0.18 ppm and 0.20 ppm for Si—$CH_3$.

2. A homopolymer elastomer characterized by the repeating group having the structure:

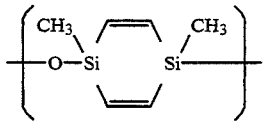

and having infrared absorption bands at 2933/cm(m.w), 1255/cm(m), 822/cm(m), Si—$CH_3$, and 1035/cm(s), Si—O—Si, and 1340/cm(m), associated with the ring, and by proton NMR showing a singlet at 6.86 ppm for —CH— and a very close doublet at 0.18 ppm and 0.20 ppm for Si—$CH_3$.

* * * * *